Figure 1:
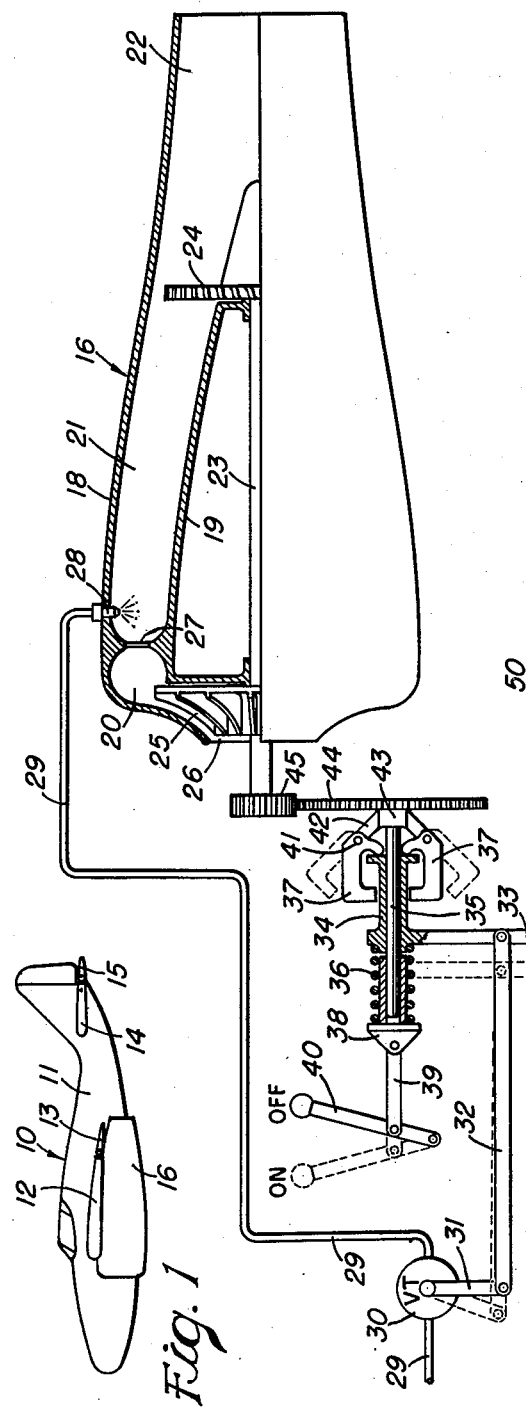

Dec. 5, 1950  W. C. TRAUTMAN  2,532,469
AIRPLANE CONTROL SYSTEM
Filed Aug. 13, 1945

INVENTOR.
W. C. TRAUTMAN
BY *E. Woodbury*
ATTORNEY

Patented Dec. 5, 1950

2,532,469

UNITED STATES PATENT OFFICE 2,532,469

AIRPLANE CONTROL SYSTEM

Walter C. Trautman, Los Angeles, Calif., assignor to Bendix Aviation Corporation, South Bend, Ind., a corporation of Delaware Application August 13, 1945, Serial No. 610,625

6 Claims. (Cl. 244—76)

This invention relates to aircraft propelled by jet engines of the type in which combustion air is supplied by a blower driven by a turbine in the path of the exhaust gas of the engine.

An object of the invention is to facilitate the control of aircraft propelled by a jet engine or engines.

A more specific object is to maintain the fuel-air mixture relatively constant during periods of acceleration and deceleration of the engine.

Another more specific object is to automatically lower the wing flaps of a jet propelled airplane when approaching a landing.

Still another more specific object is to automatically control the horizontal stabilizer of a jet propelled airplane to compensate for the torque resulting from variations in the power output of a jet engine or engines positioned out of line with the center of drag of the airplane.

Other more specific objects and features of the invention will appear from the detailed description to follow, of a specific embodiment of the invention.

In a common form of jet engine, air for combustion is received through the front end of the engine, compressed by a blower and delivered into the forward end of a combustion chamber, where it is mixed with atomized liquid fuel discharged from jets and ignited. The mixture burns and the products of combustion, of greatly increased volume, are discharged past the vanes of a gas turbine, and thence from the rear of the engine to produce the desired propulsive thrust. The gas turbine is mounted on the rear end of a shaft upon the front end of which the blower is mounted, so that the turbine drives the blower.

In a jet engine of the type described, the only control on the power output of the engine is on the supply of liquid fuel thereto, the quantity of combustion air depending in part upon the speed of the airplane, and in part upon the speed of the blower. If the supply of liquid fuel is gradually increased, the turbine speed increases to correspondingly increase the supply of combustion air without too serious an enrichening of the mixture during the transition period while the turbine is accelerating to the new speed. On the other hand, if the pilot opens the throttle suddenly to supply a greatly increased flow of fuel, the mixture may be very excessively enriched before the turbine speed accelerates to the new speed corresponding to the increased fuel supply, and the combustion resulting from the over rich mixture may seriously damage the turbine blades and cause a discharge of flame from the engine, that may damage adjacent portions of the airplane or other objects in its path. Objectionable results can also be produced by an excessively lean mixture resulting from sudden reduction of the fuel supply to the jet engine.

In accordance with the present invention, direct control of the fuel supply to a jet engine is taken out of the hands of the pilot and is made jointly responsive to the position of the pilot's throttle and the speed of the engine, so that a sudden shift of the throttle does not materially change the supply of fuel until the engine speed has had time to respond to the new position of the throttle. This result is accomplished by placing the throttle valve under the joint control of the throttle and of a governing mechanism driven by the engine.

It is often impracticable in designing jet propelled aircraft to position the jet engines at the horizontal center of drag of the airplane as a whole. Usually, it is found necessary or desirable to position the jet engine or engines below the center of drag of the airplane, with the result that the propulsive force of the engines and the force resulting from drag produce a couple tending to tip the nose of the airplane upward, and this couple must be counteracted by adjusting the horizontal stabilizers of the airplane. Of course, the torque resulting from the couple varies with the power output of the engines, and hence the pilot has to readjust the horizontal stabilizer following a change in the throttle setting. In accordance with the present invention, the same mechanism that controls the fuel supply in response to the throttle setting and the speed of the engine also adjusts the horizontal stabilizer to automatically compensate for the varying torque tending to lift the nose of the airplane.

When a jet propelled airplane is being brought in to a landing, the wing flaps must be lowered at a time when the pilot is usually engrossed with other operations in connection with the control of the airplane, and it is highly desirable to automatically lower the wing flaps at the proper time so that the pilot can be relieved of this function. In accordance with the present invention, the landing flaps can be controlled by the same mechanism that controls the fuel supply to the engine and that controls the automatic stabilizer, so that when the engine is shut down to the extent necessary for a landing, the landing flaps are fully lowered but are automatically raised when the engine is running at higher speeds.

Figure 2:
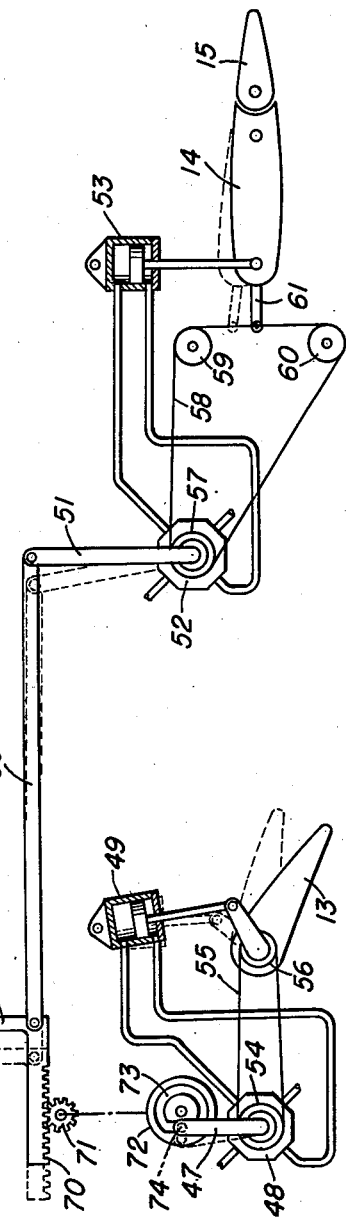

Various mechanisms can be employed for carrying out the invention, one of which is schematically illustrated in the drawing, in which Fig. 1 is a side elevation of a jet-propelled airplane, to which the invention can be applied, and Fig. 2 is a schematic diagram illustrating the control of the throttle valve, horizontal stabilizer, and landing flaps, in accordance with the invention.

Referring first to Fig. 1, there is illustrated a jet propelled airplane 10, of conventional form, having a fuselage 11, wings 12, landing flap 13, horizontal stabilizer 14, elevator 15, and a pair of jet engines 16, positioned below the wings 12. It will be observed that the jet engines 16 are positioned below the center of the wing and fuselage structure, and below the center of drag, so that the propulsive force of the engines will tend to elevate the nose of the airplane, and this force is counteracted by an adjustment of the horizontal stabilizer 14. Heretofore, both the landing flaps 13 and the horizontal stabilizer 14, together with the control of the supply of fuel have been under the direct control of the pilot.

Referring now to Fig. 2, there is shown schematically a jet engine 16, a landing flap 13, and horizontal stabilizer 14 of the airplane 10, together with the mechanism for controlling them.

The jet engine 16 is shown as comprising an outer casing 18, and an inner casing 19, which together define an annular air passage 20 and an annular combustion chamber 21, the latter feeding into a nozzle portion 22 at the rear end of the engine through which the exhaust gases are discharged to create the desired thrust. Coaxially and rotatably mounted within the engine is a shaft 23, on the rear end of which is mounted a turbine 24 in the path of the exhaust gas and on the forward end of which is mounted a blower 25, which receives air through an opening 26 in the forward end of the casing 18, and discharges it into the annular air chamber 20. From the chamber 20, the air is discharged through orifices 27 into the forward end of the combustion chamber 21, where it is mixed with liquid fuel discharged from atomizing jets 28 (only one of which is shown in the drawing) and burned. A conventional ignition system may be employed for igniting the fuel-air mixture, but the ignition means does not constitute any part of the invention.

The jet 28 is supplied with liquid fuel through a fuel line 29, containing a throttle valve 30, having a control lever 31, which is connected, by a link 32, to an arm 33, secured to a sleeve 34, slidably mounted for longitudinal movement on a shaft 35. The longitudinal position of the sleeve 34 and the setting of the throttle lever 31 is determined by the force exerted by a helical compression spring 36 against the forward end of the sleeve 34, and the force exerted by governor weights 37 against the rear end of the sleeve. The force exerted by the spring 36 is determined by the longitudinal position of a spring compressor 38, which bears against the forward end of spring 36, is slidable on the shaft 35, and is connected, by a link 39 to the pilot's throttle 40. The governor weights 37 are pivotally supported, by pivot pins 41, to arms 42, on a hub 43, which is rotatable on the shaft 35 and is driven by gears 44 and 45 from the shaft 23 of the jet engine 16.

The arm 33 is also coupled to a lever 47 on the control shaft of a four-way valve 48, which controls the supply of hydraulic fluid to a hydraulic jack 49, which is connected to the landing flap 13. Thus the arm 33 has a rack 70, driving a pinion 71, which rotates a cam 72, the latter having a cam groove 73, which engages a cam follower 74 on the lever 47. The cam 73 enables rapid movement of the lever 47 to lower the flap 13 when the engine speed drops below a predetermined value, without actuating the flap at higher speeds. The four-way valve 48 is of the follow-up type, in which the supply of fluid to the jack 49, to move the flap 13, is cut off when the flap has moved a predetermined amount corresponding to a given movement of the lever 47, and this feature is shown schematically by coupling the housing of the valve 48 to the flap 13, by a pulley 54, on the valve 48, which pulley is coupled by a belt 55 to a pulley 56 on the flap 13.

The arm 33 is also connected by a link 50, to a lever 51, on the control shaft of a four-way valve 52, which controls the supply of hydraulic fluid to a hydraulic jack 53, connected to the horizontal stabilizer 14. The housing of the four-way valve 52 is coupled to the horizontal stabilizer 14 by a pulley 57 on the housing of the valve 52, which pulley is driven by a belt 58 trained over idler pulleys 59 and 60 and connected to a lever 61 on the horizontal stabilizer 14 to produce follow-up movement.

The mechanisms, including the four-way valves 48 and 52, function to always position the landing flap 13 and the horizontal stabilizer 14 in predetermined positions with respect to the position of the control arm 33.

*Operation*

In Fig. 2 the apparatus is shown in position for slow speed operation of the airplane at substantially the minimum speed of operation of the jet engine 16, the throttle 40 being in "Off" position. Under these conditions, the spring compressor 38 is in its extreme rear (or right) position in which it loads the spring 36 to such an extent as to cause it to force the sleeve 34 into its extreme rear position, in which the governor arms 37 are in their innermost positions and the arm 33 is in position to almost close the throttle valve 30.

Now let it be assumed that the pilot desires to increase his speed and that he moves the throttle 40 into "On" position. This moves the spring compressor 38 forwardly, decreasing the loading of the spring 36 to a point where the centrifugal force developed in the governor weights 37 is sufficient to overcome the force of the spring, whereupon the weights 37 move outwardly a slight amount thereby displacing the sleeve 34 forwardly until the force of the spring 36 becomes equal to the force developed by the governor weights 37. The initial movement of the sleeve 34 is relatively slight, but it is sufficient to slightly open the throttle valve 30, thereby slightly increasing the discharge of fuel from the jets 28 in the engine. The increase in the rate of fuel supply to the jets 28 is sufficient to slightly increase the velocity of the gases of combustion and thereby increase the speed of the gas turbine 24 and the air blower 25, thereby causing the delivery of an increased amount of combustion air to balance the increased amount of fuel supply to the engine. The increased supply of air further increases the power of the engine to further increase the speed of the gas turbine 24 and the blower 25. The increased speed of the blower increases the centrifugal force in the weights 37, causing them to fly out farther and shift the sleeve 34 forwardly to further open the throttle valve 30 and further compress the spring 36. Therefore, the supply of fuel and air to the engine is gradually increased to increase the speed of the engine until the spring 36 has been compressed to a point where its reaction on the sleeve 34 balances the force exerted on the sleeve by the centrifugal force developed in the weights 37. Thereafter the speed of the engine remains constant until the throttle 40 is again adjusted.

If the throttle 40 is moved from the "On" position toward the "Off" position, the reverse action takes place. The movement of the throttle toward "Off" position shifts the spring compressor 38 rearwardly to increase the loading of the spring 36 and upset the balance between the forces exerted on the sleeve 34 by the spring 36 and by the governor weights 37, and causes the sleeve 34 to move rearwardly a slight amount thereby slightly closing the throttle valve 30. This leans the fuel air mixture supplied to the jet engine to a slight extent and decreases its speed thereby decreasing the amount of combustion air supply by the blower 25 and also reducing the centrifugal force developed in the governor weights 37 to permit the spring 36 to move the sleeve 34 rearwardly and further close the throttle valve 30.

It will be observed that the mechanism described functions to automatically delay a change in the setting of the throttle valve 30 following movement of the throttle 40 until the engine has had time to alter its speed in direction to change the supply of combustion air in the same direction that the fuel supply has been changed. This reduces variations in the fuel-air ratio to such an extent as to prevent damage to the turbine 24 or to other parts of the jet engine or of the airplane that otherwise would result from excessively rich or excessively lean mixture.

It is believed that the operation of the landing flap 13 and of the horizontal stabilizer 14 is self-evident, since those elements are directly controlled in accordance with the setting of the sleeve 34. Since the sleeve 34 is moved gradually into any new position corresponding to any new setting of the throttle 40, the landing flap 13 and the horizontal stabilizer 14 are likewise slowly moved into their new positions corresponding to different speeds of the engine. Of course, the position of the sleeve, or actuating member 33, which controls the settings of the throttle valve 30, the landing flap 13, and the horizontal stabilizer 14 is dependent not only upon the speed of the engine but also upon the setting of the throttle 40. However, since, except during transition periods, the speed of the engine is always a function of the setting of the throttle 40, the desired movements of the landing flap 13 and the horizontal stabilizer 14 can be obtained by simply choosing the proper linkage for coupling the actuating member 33 to the valves 48 and 52 respectively.

It is preferable, however, to have the landing flap 13 and the horizontal stabilizer 14 jointly controlled by the setting of the throttle 40 and the speed of the engine, rather than to have them controlled by the speed only of the engine blower 25, because the settings of the landing flap and the horizontal stabilizer should be determined by the thrust of the engine and the thrust is a function of the rate of fuel supply as well as the speed of the blower.

The landing flap 13 can be made to lower gradually over any speed range desired by suitable design of the cam groove 73. For example, the flap-actuating mechanism can be so adjusted that it starts to lower the flap 13 at an engine speed corresponding to an airplane speed of 300 M. P. H. and reach its full down position at an engine speed corresponding to an airplane speed of 200 M. P. H. If during a landing, it becomes necessary to gain speed, the flaps automatically raise as the engine speed increases regardless of the forward speed of the airplane. Furthermore, the structure described functions automatically to raise the flap 13 when the throttle is in full "On" position and the engine is running at corresponding speed, irrespective of the forward speed of the aircraft.

To simplify the explanation of the invention, it has been illustrated in highly schematically form, the actual structures necessary to incorporate the invention in an airplane being well known to those skilled in the art. Furthermore, many departures from the particular structures disclosed can be made without departing from the invention, which is to be limited only to the extent set forth in the appended claims.

I claim:

1. A control system for a jet engine having means for supplying fuel to the engine at a controlled variable rate and means for supplying combustion air at a rate dependent upon the speed of the engine, said system comprising: a throttle; an actuating member connected to the fuel supply means for varying the rate of fuel supply to the engine; spring means applying a force to said actuating member to urge it in direction to reduce the rate of fuel supply; means for varying the loading of said spring means in response to movement of said throttle; and means responsive to the speed of the engine for increasingly opposing the force exerted on said actuating member by said spring means as the speed of the engine increases; whereby the rate of fuel supply to the engine is jointly responsive to the setting of the throttle and the speed of the engine.

2. A system as described in claim 1 for a jet engine having an exhaust-actuated turbine driving a blower for supplying combustion air to the engine, in which said means responsive to the speed of the engine is coupled to said blower.

3. A system as described in claim 1 in which said means responsive to the speed of the engine comprises a centrifugal governor mechanism.

4. A system as described in claim 1 for a jet engine in which the means for supply fuel at a controlled variable rate consists of a source of fuel under pressure connected to the jet engine through a throttle valve and in which said actuating member is connected to and controls the opening of the throttle valve.

5. In a jet-propelled airplane having a jet engine displaced from the center of drag of the airplane and having a stabilizer for trimming the airplane, said engine having a turbine-driven blower: a throttle for said engine; a fuel control member for varying the rate of fuel supply to the engine; spring means applying a force to said member to urge it in such direction as to reduce the rate of fuel supply; means for varying the loading of said spring means in response to movement of said throttle; means responsive to the speed of the blower for increasingly opposing the force exerted on said member by said spring means as the speed of the blower increases; whereby the rate of fuel supply to the engine is jointly responsive to the setting of the throttle and the speed of the blower; and means coupling said member to said stabilizer for varying the setting of said stabilizer to compensate for changes in the torque resulting from variations in the speed of the blower, and the throttle setting.

6. In a jet-propelled airplane having a jet engine comprising a turbine-driven blower and a landing flap: a throttle; a fuel control member for varying the rate of fuel supply to the engine; spring means applying a force to said member to urge it in such direction as to reduce the rate of fuel supply; means for varying the loading of said spring means in response to movement of said throttle; means responsive to the speed of the blower for increasingly opposing the force exerted on said member by said spring means as the speed of the blower increases, whereby the rate of fuel supply to the engine is jointly responsive to the setting of the throttle and the speed of the blower; and means coupling said member to said landing flap for moving said landing flap toward landing position in response to a decrease in the speed of said blower, and the throttle setting.

WALTER C. TRAUTMAN.

REFERENCES CITED

The following references are of record in the file of this patent:

UNITED STATES PATENTS

| Number | Name | Date |
|---|---|---|
| 1,312,899 | Esnault-Pelterie | Aug. 12, 1919 |
| 1,367,840 | Tarbox | Feb. 8, 1921 |
| 1,753,436 | Knudsen | Apr. 8, 1930 |
| 2,078,957 | Lysholm | May 4, 1937 |
| 2,079,677 | Brown | May 11, 1937 |
| 2,096,203 | Schnurle et al. | Oct. 19, 1937 |
| 2,272,664 | Gropler | Feb. 10, 1942 |
| 2,279,615 | Bugatti | Apr. 14, 1942 |
| 2,280,835 | Lysholm | Apr. 28, 1942 |
| 2,305,311 | Jendrassik | Dec. 15, 1942 |
| 2,377,386 | Stalker | June 5, 1945 |
| 2,386,521 | Watter | Oct. 9, 1945 |

FOREIGN PATENTS

| Number | Country | Date |
|---|---|---|
| 124,822 | Great Britain | Apr. 10, 1919 |
| 622,991 | Germany | Jan. 10, 1935 |